(No Model.)

G. E. SMITH.
Piston Packing.

No. 231,198. Patented Aug. 17, 1880.

Attest:
Courtney A. Cooper.
William Paxton.

G. E. Smith
By his attorney
Charles E. Foster

UNITED STATES PATENT OFFICE.

GEORGE E. SMITH, OF NEW YORK, ASSIGNOR TO OTIS BROTHERS & CO., OF YONKERS, N. Y.

PISTON-PACKING.

SPECIFICATION forming part of Letters Patent No. 231,198, dated August 17, 1880.

Application filed April 29, 1880. (No model.)

*To all whom it may concern:*

Be it known that I, GEORGE E. SMITH, a citizen of the United States, residing in New York city, New York, have invented an Improvement in Piston-Packing, of which the following is a specification.

My invention relates to that class of piston-packings in which a cup-packing is combined with expansible packing-rings, and constitutes an improvement upon the packing for which Letters Patent of the United States were granted to C. H. Baldwin on the 21st day of October, 1879.

Figure 1:
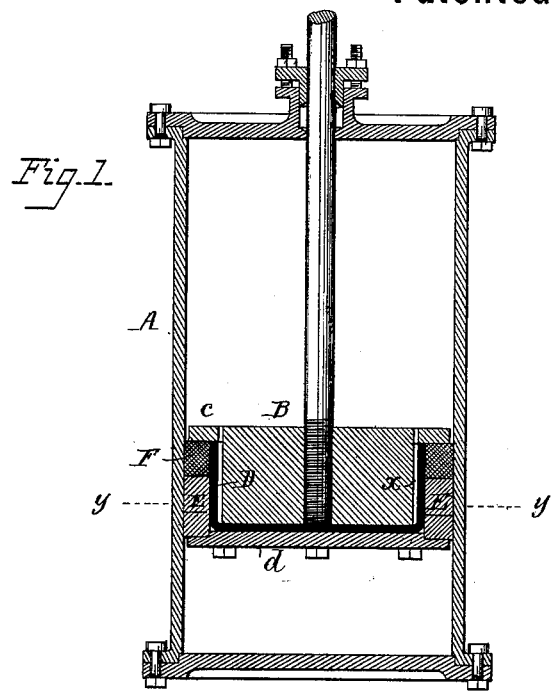
Figure 2:
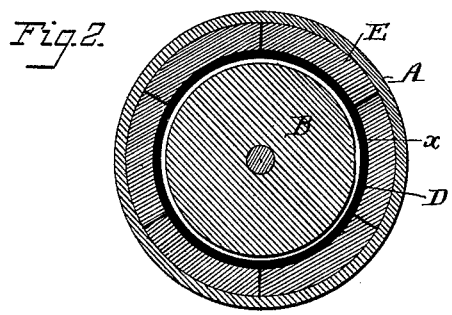
Figure 3:
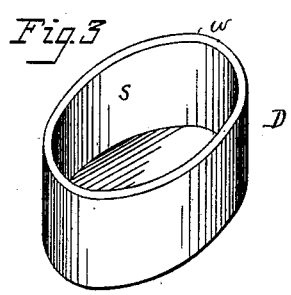

In the drawings forming part of this specification, Figure 1 is a longitudinal section of a cylinder and piston adapted for use in a hydraulic elevator, the piston being provided with my improved packing. Fig. 2 is a section on the line $y\ y$, Fig. 1. Fig. 3 is a perspective view of the cup-packing detached.

The cylinder A, the piston B, its flange $c$, plate $d$, and rings E F are constructed as set forth in the aforesaid patent to Baldwin, or in any other suitable manner.

D is a cup-shaped packing, of leather or other suitable material, the sides or flange $s$ of which is at right angles to the bottom, and lies in contact with the inner sides of the packing-rings, against which it is pressed by the water, gas, or other motor fluid passing from the cylinder to a chamber or channel, $x$, between the cup and the piston-head.

In the aforesaid patented packing granted to Baldwin the cup D is provided with a lateral flange, which bears against the inside of the cylinder and detracts from the flexibility of the side flange, $s$, so that the rings near the flanged edge are subjected to but little pressure tending to expand them; but in the construction above described the edge $w$ of the side flange, $s$, is flexible, and can spread freely under the internal pressure without being limited by contact with the cylinder.

I have found that this construction will insure a very close contact of all the rings with the cylinder throughout the entire periphery of the piston, preventing the unequal wear which results when a lateral flange limits the flexibility of the edge of the cup, while the latter is more easily made and at less cost.

The rings or segments E F may be of any suitable material, of any required shape and number, and one, two, or more cups, D, may be combined with one piston or other object to be packed, as may be found necessary or desirable.

I claim—

The combination, with a piston provided with a series of packing-rings, and with a channel or chamber, $x$, within said rings, of a cup-shaped packing, provided with a flange, $s$, at right angles to the bottom, flexible throughout and bearing externally against all of said rings, substantially as set forth.

In testimony whereof I have signed my name to this specification in the presence of two subscribing witnesses.

GEORGE E. SMITH.

Witnesses:
H. T. MUNSON,
T. H. PALMER.